(12) United States Patent
Testardi

(10) Patent No.: US 6,249,882 B1
(45) Date of Patent: Jun. 19, 2001

(54) METHODS AND SYSTEMS FOR AUTOMATED SOFTWARE TESTING

(75) Inventor: Rich P. Testardi, Berthoud, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/097,418

(22) Filed: Jun. 15, 1998

(51) Int. Cl.[7] .................................................. G06F 11/00
(52) U.S. Cl. ............................................................ 714/38
(58) Field of Search ................................ 714/38, 3, 25, 714/15, 32, 35, 37, 39, 47; 395/702, 704, 600, 604, 701, 712

(56) References Cited

U.S. PATENT DOCUMENTS

| | | | |
|---|---|---|---|
| 5,335,342 | * | 8/1994 | Pope et al. .............................. 395/575 |
| 5,634,098 | * | 5/1997 | Janniro et al. .................... 395/183.14 |
| 5,651,111 | * | 7/1997 | McKeeman et al. ............ 395/183.14 |
| 5,664,173 | * | 9/1997 | Fast ........................................ 395/604 |
| 5,740,353 | * | 4/1998 | Kreulen et al. .................. 395/183.18 |
| 5,754,760 | * | 5/1998 | Warfield ........................... 395/183.14 |
| 5,758,061 | * | 5/1998 | Plum ................................. 395/183.11 |
| 5,805,795 | * | 9/1998 | Whitten ............................ 395/183.14 |
| 5,862,362 | * | 1/1999 | Somasegar et al. ................... 395/500 |
| 5,892,947 | * | 4/1999 | DeLong et al. ........................ 395/701 |
| 5,905,856 | * | 5/1999 | Ottensooser ..................... 395/183.14 |
| 5,949,999 | * | 9/1999 | Song et al. ............................ 395/701 |
| 6,023,580 | * | 2/2000 | Sifter .................................... 395/704 |

* cited by examiner

*Primary Examiner*—Nadeem Iqbal (57) ABSTRACT

Methods and associated structures and systems for automating software test procedures so as to enable automated black box and white box testing techniques to be performed in an automated manner. The present invention further provides for test sequences to be easily maintained in synchronization with corresponding changes in the underlying source code files. In particular, white box and black box test sequences are described in a test language of the present invention in a manner which is embedded within comments of the programming language used to implement the software product. Such comments are ignored by software development tool sets. Testing tools of the present invention parse the source code files to extract white box and black box test sequences defined in the comments therein. The test sequences so extracted are then performed by the test tool in cooperation with a software debugging tool for purposes of applying stimuli both for black box testing of the software product as a whole and for white box testing of internal functions and modules of the software product.

24 Claims, 4 Drawing Sheets

METHODS AND SYSTEMS FOR AUTOMATED SOFTWARE TESTING

BACKGROUND OF THE INVENTION

1. Field of the Invention

The present invention relates to software testing techniques and in particular to methods and associated systems and structures for automated software testing which integrates test definitions with source code of the software product under test.

2. Discussion of Related Art

Computer programs (also referred to herein as software products) evolve in an engineering process which is iterative. A software development process involving software design engineers is used to initially design and implement the software product. Testing of the initial design then verifies operation of the software product. Often the test and development processes repeat in an iterative manner to complete the development of the software product to a point where the program is substantially free of errors (also referred to as bugs).

In general, the program development process involves a programmer designing a solution for a problem described by a specification or functional requirement. The programmer proceeds first at a high-level envisioning abstract modules and functions to be performed. The high level abstractions are then further decomposed by the programmer (also referred to as software engineer) into corresponding lower levels in which the higher level design is implemented in a computer programming language. For example, programmers often utilize the C programming language, the C++ language, or the Java programming language for implementing a particular software product. Components of the software product written in such programming languages are often referred to as source code. The source code is created by programmers and stored in collections of files often referred to as source code files.

These programming languages are not directly executed by computers. Rather, computers execute instructions at a much lower level often referred to as machine code. The programs written in source code programming languages are then compiled, a step involving the translation of the source code files from the selected computer programming language to a machine code format suitable for execution by a general-purpose computer.

Programmers use a wide variety of sophisticated tools in performing software development tasks. Such software development tools often tightly integrate a variety of individual components utilized by software engineers in the development process. For example a text editor is often a first component utilized by software engineer to construct source code files for a particular product. In an integrated tool set, such a text editor may be particularly customized for the source programming language utilized by the programmer. In addition, higher level design tools and documentation generation tools may be integrated with the text editing process so as to document components of the eventual product design. Further tools include, compilers for translating source code into lower-level machine code operable on a particular computing environment. Still other tools include debugging tools used by the programmer to test the functionality of the designed software product while viewing the corresponding source code.

The program's source code therefore reveals it's structure and function in that the design of the source code represents internal structure of the software product. Such internal structure implements the requisite function of the product but is otherwise substantially transparent to the user of the software product. Rather, the user of the software product applies inputs to the software product in accordance with the specifications of the program and expects resultant outputs in accordance with the specifications.

Following initial development of a software product, an iterative process follows in which the software product is tested against specifications of its intended function. Problems found by such testing procedures are corrected by the programmer(s) by locating the reason for the problem using debugging tools and techniques, editing the source code files and re-compiling the source code. Following such debugging sessions, the program is re-tested verify proper operation or to locate other problems or new problems in need of "debugging." Such testing and debug cycles may be performed by an individual programmer or by teams often divided into subsets of program development engineers and testing engineers.

In general, testing of software involves applying data (generally referred to as stimuli) as input to the software product and determining that the program's behavior and output generated is in accordance with functional requirements and other specifications. When the testing engineer or testing team is separate and distinct from the program development engineer or development team, it is common that such testing is performed in a manner often referred to as "black box" testing. Such testing is referred to as black box in the sense that data or stimuli is applied as input and the output is evaluated without inspection, or even necessarily knowledge of, the internal structure of the software product reflected in the source code. In other words, the testing engineer views the software product as a black box, the internal structure and functions of which are not relevant to the test sequence and test result evaluation.

Conversely, testing procedures which utilize internal knowledge of the software product structure and function is often referred to as "white box" testing. The term white box testing refers to the fact that the tester has knowledge of the internal structure and design of the software product under test. For example, the testing engineer may direct particular types of stimuli or data as input to the software product knowing that the internal structure may be better exercised thereby. Or, for example, white box testing may involve design and application of a test sequence directed to exercising particular functions within the software product.

Tools for automating test procedures have evolved largely independent of the tools for programmers to design and debug software products. For example, it is known in the art to create and utilize automated testing tools which permit the test engineer to configure a sequence of input stimuli to be applied to the software product and to automate the gathering of resultant output data. Testing tools as presently known also provide the ability to automate the evaluation of the generated output to determine whether it complies with requirement specifications. Operation of computer programs are significantly dependent upon parameters outside of the specific input stimuli. Such external environmental conditions might, for example, include the state of the computer system on which the program runs. Testing tools have therefore included the ability to set up an external computing environment in preparation for execution over particular test. In other words environmental parameters of the computing system on which the program is run, as distinct from input stimuli applied to the software product program, may be configured by the automated test tool prior to performing a particular automated test sequence on the software product. For example, particular configuration parameters of the software product may be defined (e.g., in a configuration file) prior to performing a particular automated to sequence. Or, for example, configuration parameters associated with the computing system in which the software product operates may be configured prior to performing a particular automated to sequence.

In addition, present automated software test tools have included the ability to define test sequences is in a portable manner largely independent of the design methodology and tools used for program development. For example, present automated software test tools often use a script language to define input stimuli and environments and to operate programs to analyze the generated output. A test sequence and expected outputs defined in such a script language is often referred to as a test script. Such a script language is independent of the particular computer programming language used to implement the software product. The syntax and semantic of the script language is usually defined by the test tool itself and therefore parsed and otherwise processed by the test tool to perform desired test sequences defined in the test scripts. Present automated test tools are therefore portable in that the test sequences are portable across a wide variety of computing environments and are independent of the computer programming language used to implement the program.

In general, it is considered desirable for a software product to be tested in a manner which ensures significant coverage of the various execution paths within the software product. Most computer programs include significant sequences of logical controls (Boolean tests) which branch among various paths of the software product in response to results of tests within the program. One metric of the efficacy of software testing tools and techniques is the degree to which all possible branches in a program are tested by the test tool.

Automated test tools as presently known in the art are limited in their test capabilities, in large part, because of the limitations of "black box" testing. Though present test techniques provide significant automation for the test engineer in applying stimuli and gathering output results, they are limited in that through black box testing techniques is difficult to effectuate testing of the internal structures and functions of the software product. Such black box testing tools merely apply stimuli within a prescribed range of appropriate input values and verify the resultant output. These tools are therefore largely precluded from effectively testing internal data structures and internal functions which are not easily accessible through application of external stimuli. It is therefore difficult for black box testing techniques to assure test coverage which exercises all, or even a significant portion in some cases, of the possible branch paths through the software product. Rather, it is preferable to use "white box" test techniques to assure adequate test coverage of the internal structure and function of a program.

It is therefore problem in software testing to provide tools which automate software testing procedures in a manner which permits white box testing techniques to be applied to software product.

Is a further problem in the testing of software products to maintain white box test sequences in synchronization with changes made to the software product. Since software development tools and testing tools tend to be largely independent, is a problem for a software development engineering teams and software test teams to maintain synchronized versions of test sequences and corresponding software versions.

In view of the above discussion, it is evident that a need exists for improved software testing tools which permit both black box and white box testing techniques to be applied to software products in an automated fashion and in a manner which permits synchronization of the test sequences and changes made to corresponding software modules.

SUMMARY OF THE INVENTION

The present invention solves the above and other problems, thereby advancing the state of the useful arts, by providing methods and systems for automating white box and black box testing techniques as applied to software products. Further, the present invention provides for such automated testing while enabling synchronization of the test sequences with changes made to corresponding software modules.

In particular, the present invention provides for defining test sequences as embedded within the source code of a software product. Tools of the present invention parse the software source code files to extract embedded test sequences and to perform those extracted test sequences on the software product. The embedded test sequences include definitions of black box test sequences as well as a white box test sequences. The test sequences extracted from software modules are applied to the software program through cooperative use of a software debugger tool. Software debugging tools as presently practiced in the art permit the testing tools of the present invention to apply white box test sequences to particular modules and functions within the software product. The white box test sequence embedded within the software source code modules of the software product are therefore extracted by the testing tool of the present invention and applied to the software product in co-operation with the debugging tool. The debugging tool returns values generated by particular software functions for further analysis by the testing tool to verify proper operation of the particular function.

The white box and black box test sequences are embedded within functions and modules of the source code files of the software product in a manner transparent to the underlying programming language used for development of the program. For example, in the preferred embodiment, the test sequences are embedded within source code files of the software product as comments within the particular programming language used to implement the program. Such comments are ignored, in general, by software development tools utilized by program development engineers. Such comments therefore serve only to document the structure and function of the software product and, in accordance with present invention, provide test sequences for extraction and evaluation by the testing tool of the present invention.

The test sequences defined as comments within the functions and modules of the software product are therefore maintainable in a manner which permits synchronization with changes made to the underlying software product. For example, the program development engineer may define black box and white box test sequences appropriate for each module or function of the software product and embed such sequence in comments of the source code files. As the engineer changes a particular function or module, the corresponding test sequences may be easily modified to correspond to the changes made in the underlying software module or function.

As noted above, the testing tool of the present invention performs embedded test sequences through cooperative execution of a debugger tool. The debugger tool enables application of black box stimuli to the program by executing the program, through the debugger tool, with particular input values defined by the black box test sequence. More importantly, the use of a debugger tool enables the application of white box test sequences by invoking particular internal functions with particular parameter values and by allowing setting of desired values in internal data structures of the program under test.

Since debugger tools are widely available in most program development toolsets, use of the debugger tool retains the portability features of present test tools while enabling the automation of both black box and white box test sequences. Further, since the test sequences are defined as comments embedded within the source code files of the program, the test sequences are easily maintained in synchronization with changes in the underlying, internal structures and functions.

The above, and other features, aspects and advantages of the present invention will become apparent from the following descriptions and attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
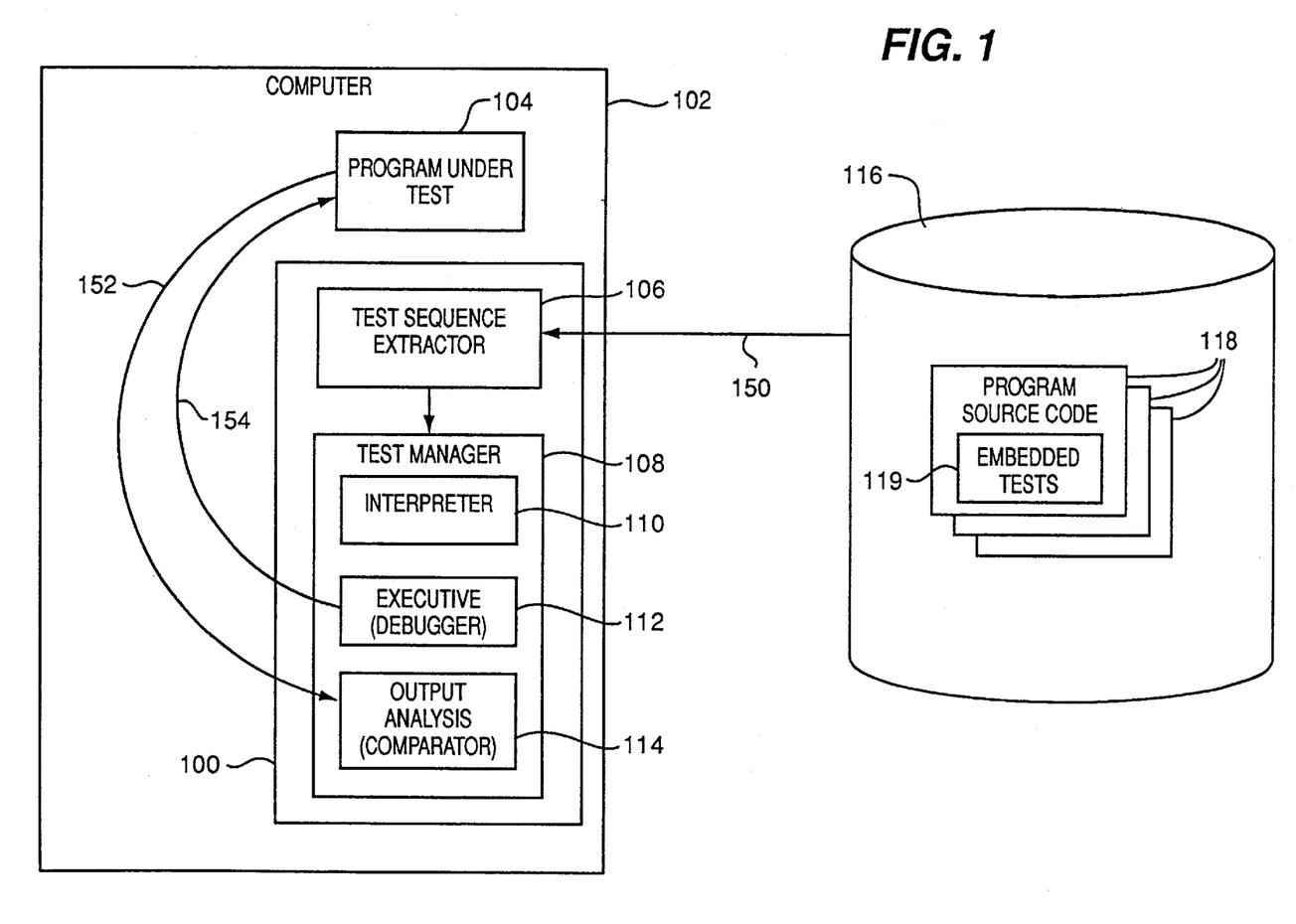
FIG. 1 is a block diagram of a system for automated testing of a program under test in accordance with the present invention.

FIG. 1 is a block diagram of a system operable in accordance with the present invention to automate testing of a computer program. Preferably, both program under test 104 and automated test tool 100 are operable on computer 102. Those skilled in the art will readily recognized that automated test tool 100 and program under test 104 may equivalently operate on different computers using well-known distributed computing techniques and communication protocols.

Automated test tool 100 includes test sequence extractor 106 operable to extract test sequence information from program source code files 118 stored on mass storage device 116 and connected to computer 102 via path 150. As above, those skilled in the art will recognize that mass storage device 116 may be locally attached to computer 102 or may be accessed via remote distributed computing techniques well-known to those skilled in the art. Specifically, test sequence extractor 106 parses program source code files 118 corresponding to program under test 104 for purposes of locating embedded test sequence descriptions 119 within the program source code files 118. As described further herein, the embedded test sequences are preferably embedded within comments of the programming language used for the program source code files 118. For example, in the C/C++ programming languages, all text included within any comment of the programming language is generally ignored for purposes of compiling and operating the program. The test sequence directives and parameters associated with automated test tool 100 may therefore be embedded within such comment fields without impacting compilation and operation of the program.

Test sequences so extracted by test sequence extractor 106 are provided to test manager 108 for execution of the test sequences described therein and analysis of the results of the test sequence execution. In particular, test manager 108 includes interpreter 110 for determining the test sequences to be performed from the test command and directives extracted from source code files 118 by test extractor 106. Interpreter 110 parses the extracted test directives and commands to generate appropriate environments in which the test sequence is to operate, to invoke the program as required to perform the test sequence, and to evaluate the generated output and side effects of operating the program in accordance with the test sequence. As discussed herein below the interpretation of the commands to set up the initial environment, perform the test, and evaluate the generated output, varies depending upon whether the test sequence is a black box test sequence or white box test sequence.

Once the test sequence commands and directives have been interpreted by interpreter 110, executive 112 within test manager 108 invokes the program under test 104 so as to perform the desired test sequence. As noted above, test manager 108 through interpreter 110 has initialized the environment of computer 102 as required to perform the desired test sequence. Invocation of program under test 104 by executive 112 is indicated by arrow 154. Output generated by program under test 104 is captured by output analysis element 114 in test manager 108 as indicated by arrow 152. Output analysis 114 compares output values generated by program under test 104 with expected values as defined by the test sequence embedded within program source code files 118. As used herein, output includes output values generated by the program under test 104 (as executed by the executive 112) as well as environmental side effects as discussed further herein below.

Figure 2:
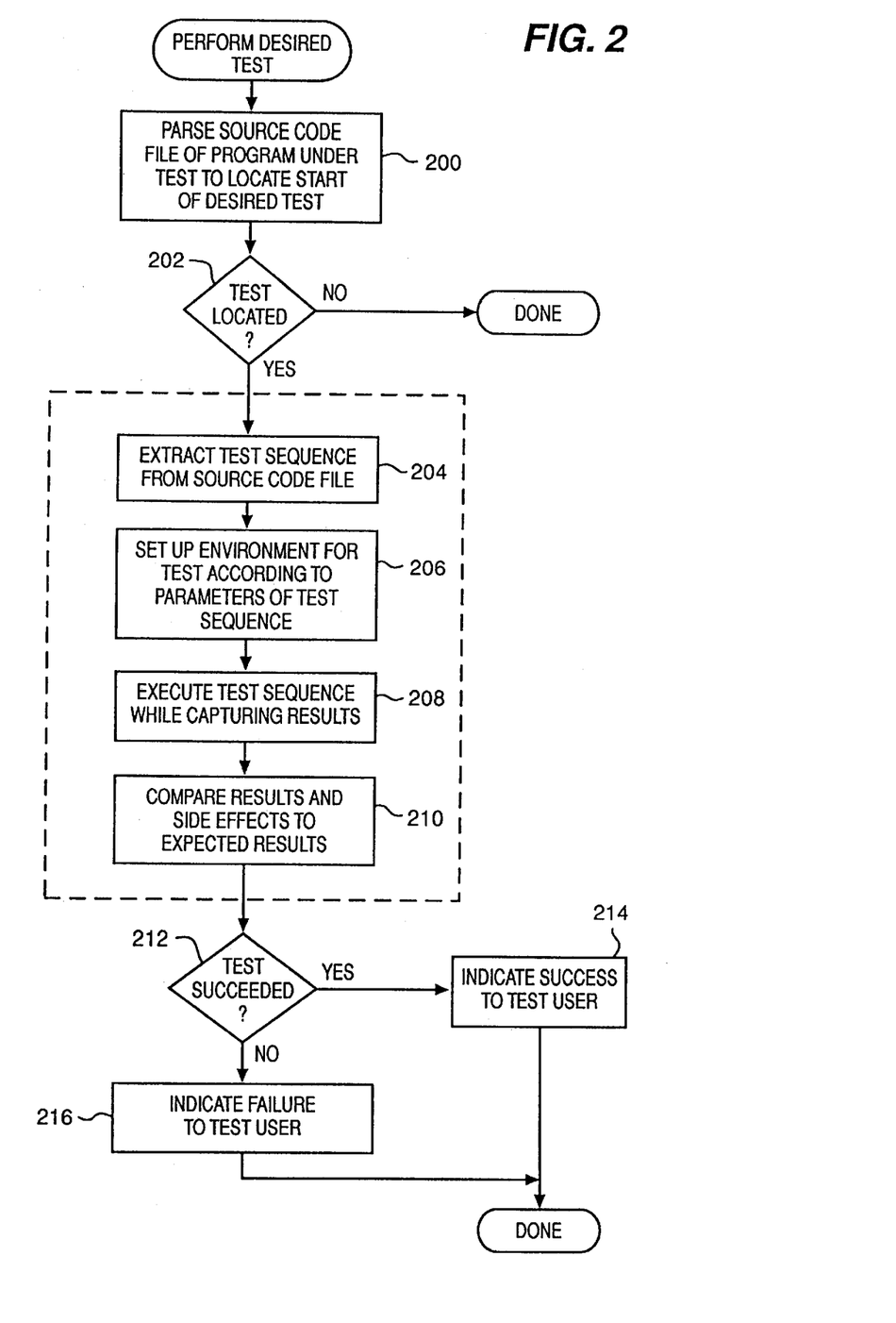
FIG. 2 is a flow chart describing a method of the present invention generalized for both black box and white box test techniques in accordance with the present invention.

FIG. 2 is a flow chart describing operation of methods of the present invention which automate program testing using test sequences embedded within the programs source code. The flow chart of FIG. 2 is representative of both black box and white box testing techniques of the present invention. Differences between the two techniques are discussed further herein below with regard to FIGS. 3 and 4.

Element 200 is first operable to parse source code files of the program under test for purposes of locating a desired test identified by the user. Preferably, each test embedded within the source code files of the program under test is identified by a unique identifier (i.e., a name for the test). When the test method of the present invention is invoked, the user preferably identifies the test by name which is to be performed. In the preferred embodiment, a user may also request execution of multiple named test or all tests embedded within the source code files of a program under test. In such a case, the method of FIG. 2 is repeated and element 200 is operable to find a next desired test sequence embedded within the program under test.

Element 202 is next operable to determine whether the requested test (or next test) was successfully located in the source code files of the program under test. If not, the method of FIG. 2 is completed. Where the desired or next test is located by operation of elements 200 and 202, element 204 is next operable to extract the located test sequence from source code files of the program under test. In particular, as discussed further herein below with regard to the preferred syntax of test directives, element 204 extracts all lines associated with the requested test as indicated by a marker token (a unique string used to identify test directives within comment fields).

The test directives and parameters so extracted by operation of element 204 are then interpreted by element 206 for purposes of setting up any required environment of the computing system for operation of the test. For example, in performing a black box test as discussed further herein below, particular environmental parameters of the computing system as a whole may need to be initialized (i.e., shell variables, file system directory structures, etc.). Or, for example, when performing a white box test as discussed further herein below, particular global variables within the program under test may need to be initialized prior to performing the test sequence.

Element 208 is then operable to execute the test sequence while capturing the generated output results therefrom. For example, in performing a black box test sequence, element 208 is operable to execute the program under test to completion. Input streams required for performing the test were initialized as required by element 206 above. Output stream capturing of the test results further comprises re-direction of the output streams generated by operation of the program under test. The output streams are redirected for capture into a file and later comparison against expected results.

As noted above, captured output includes printouts generated by the test executive (debugger tool) which reveal the side effects on computer environmental variables. The test executive (debugger tool) is directed to display present values of identified variables through the supported test directives of the test manager. These present values are captured along with other standard output generated by operation of the program for comparison with expected values.

Element 210 is then operable to compare the captured results (output values including any side effects of interest) against expected results as specified in the test sequence itself. For example, when performing a white box test sequence, desired values of local or global variables may be compared against the actual values of such variables. In like manner, return values from function invocation's may be compared against expected values.

Element 212 is then operable to determine whether the comparisons performed by element 210 are indicative of success or failure of the test sequence. Where the comparisons indicate successful test sequence operation, element 214 is next operable to indicate successful completion of the test sequence to the test user. Where comparisons by element 210 suggest failure of the test sequence, element 216 is operable to indicate to the user apparent failure of the test sequence. In both cases, the method described by FIG. 2 is completed.

Those skilled in the art will readily recognize that FIG. 2 represents a generalization of both black box and white box methods of the present invention for automating test procedures. First, details regarding specific operations for black box testing techniques and white box testing techniques are discussed in further detail herein below. Secondly, operation of elements 204 through 210 are shown to be serial in nature.

That is, as shown in FIG. 2, element 204 completes its operation to extract a complete test sequence from source code file before elements 206 through 210 operate to set up the environment, execute the test, and compare the output results to expected results, respectively. Those skilled in the art will recognize that elements 204 through 210 may operate in an iterative/incremental manner wherein their operations are guided by the sequence of test directives and commands provided by the test user. In other words, each directive may be interpreted and appropriate actions taken to complete that directive before another directive is processed. In this manner, the sequence of test directives dictate when each action in the test sequence is to be performed relative to other actions in the sequence.

Figure 3:
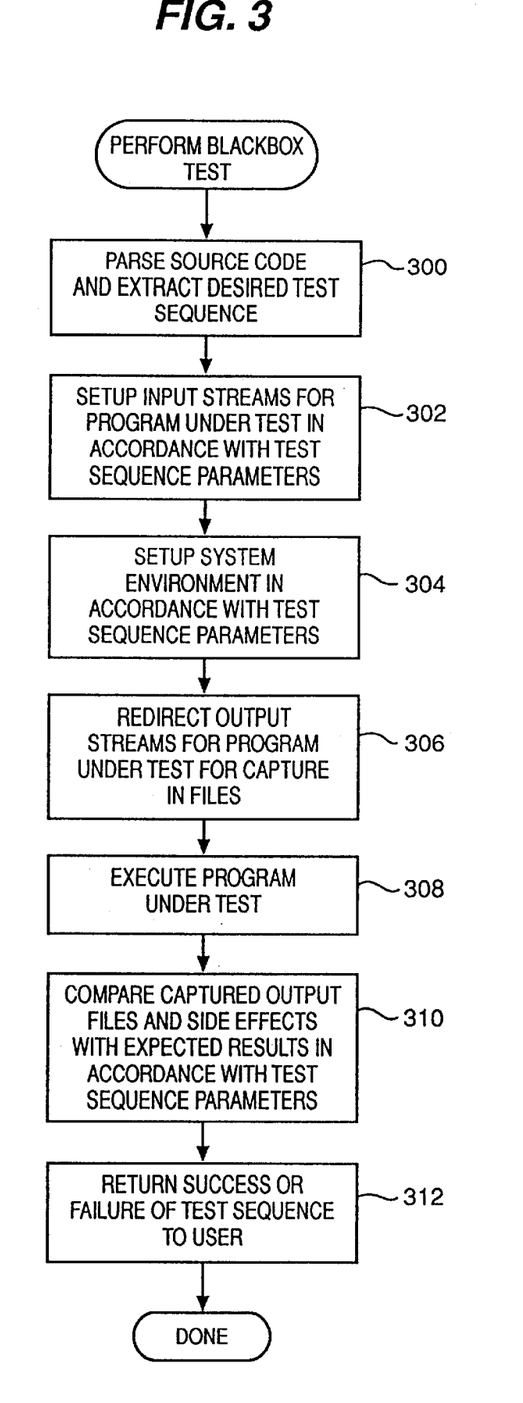
FIG. 3 is a flow chart describing a method of the present invention as specifically adapted for black box testing in accordance with the present invention.

FIG. 3 and is a flow chart describing the method of FIG. 2 in additional detail with respect to operation for black box testing techniques. As noted above, black box testing techniques test the overall operation of a program by applying input values to the program and monitoring corresponding output values to compare actual output values with expected output values. For black box testing purposes, the test directives and commands processed by the methods of the present invention define input streams (files or other sources of input) to be applied to the program, and further define expected output values to be generated by operation of the program in view of the provided test input streams. In general, the input streams are specified in the test directives by providing filenames for files containing desired test data. In like manner, test directives and commands specify files containing expected output values for use in comparison against actual, captured output values. Actual output value are captured from the output generated by the program under test when executed and operating upon the provided test input streams.

Element 300 is first operable to parse source code files associated with the program under test and to extract desired test sequences. Element 300 is operable a manner analogous to that of elements 200 through 204 described above with respect to FIG. 2. Element 302 is then operable to set up input streams for use by the program under test in accordance with test sequence extracted in operation of element 300. As noted above, input streams are preferably defined by the test directives as files on a mass storage device associated with the computer. The files contain desired test input values to be used in verifying the operation of the program under test. One or more such files will typically be provided as required by the specifications of the program under test. For example, some programs may require but a single stream of input while others may manipulate data extracted from a plurality of input streams.

Element 304 is then operable to set up any required system environment parameters in accordance with parameters defined by the test sequence as extracted in element 300. It is common in many computing systems to have system parameters definable by a user. For example, Unix shell or MS-DOS command processing programs both allow for local values to be defined in a manner that is accessible to programs run from the system. Such shell variables are often required for operation of a program under test. A particular set of values associated with the shell variables may be desired or required to run the program under test for purposes of testing a particular feature thereof. Element 304 therefore is operable to set any such system environment parameters required to perform the desired test sequence.

Element 306 is then operable to redirect any output streams generated by execution of the program under test for saving generated output in files on the mass storage system associated with a computer. A program under test may generate one or more output streams in response to execution with particular input values provided. Each such output stream generated may be captured and saved in a file and for later comparison against expected values.

Element 308 is then operable to execute the desired program and apply the specified input files to the appropriate input streams for operation of the program. As noted above, output streams generated by the program's execution may be captured in accordance with the re-direction setup by element 306. A debugger tool is preferably used for black box testing as well as white box testing. In white box testing, as described further below, the debugger tool is used to invoke particular functions within a program and to set particular variables within the program for testing purposes. In black box testing, the debugger tool may be used to force particular error conditions within the program while executing to completion. This allows for checking of proper operation of the program, as a whole, in response to particular failure conditions within the program's execution. For example, a common failure to detect is exhaustion of a particular allocated resource used by the program (i.e., dynamic memory allocation or file storage allocation). In black box testing, the debugger tool is used to force a particular function call to fail to simulate such a resource allocation failure condition. The test can then determine if the program executes to completion with an appropriate "graceful" exit or fails to perform as expected.

Upon completion of execution of the program under test, element 310 is then operable to compare the captured output streams with expected results in accordance with parameters defined by the test sequence. In particular, the test sequence defines files of expected output values to be used for comparison with the captured files generated by output streams of the program under test. Lastly, element 312 is operable to return to the user an indication of success or failure in operation of the test sequence.

Those skilled in the art will understand that FIG. 3 shows operation of elements 300 through 310 as serial or sequential in nature. It will be readily recognized that such operations may be performed iteratively so as to repeatedly run one or more programs while gathering generated output streams for comparison against expected results.

Figure 4:
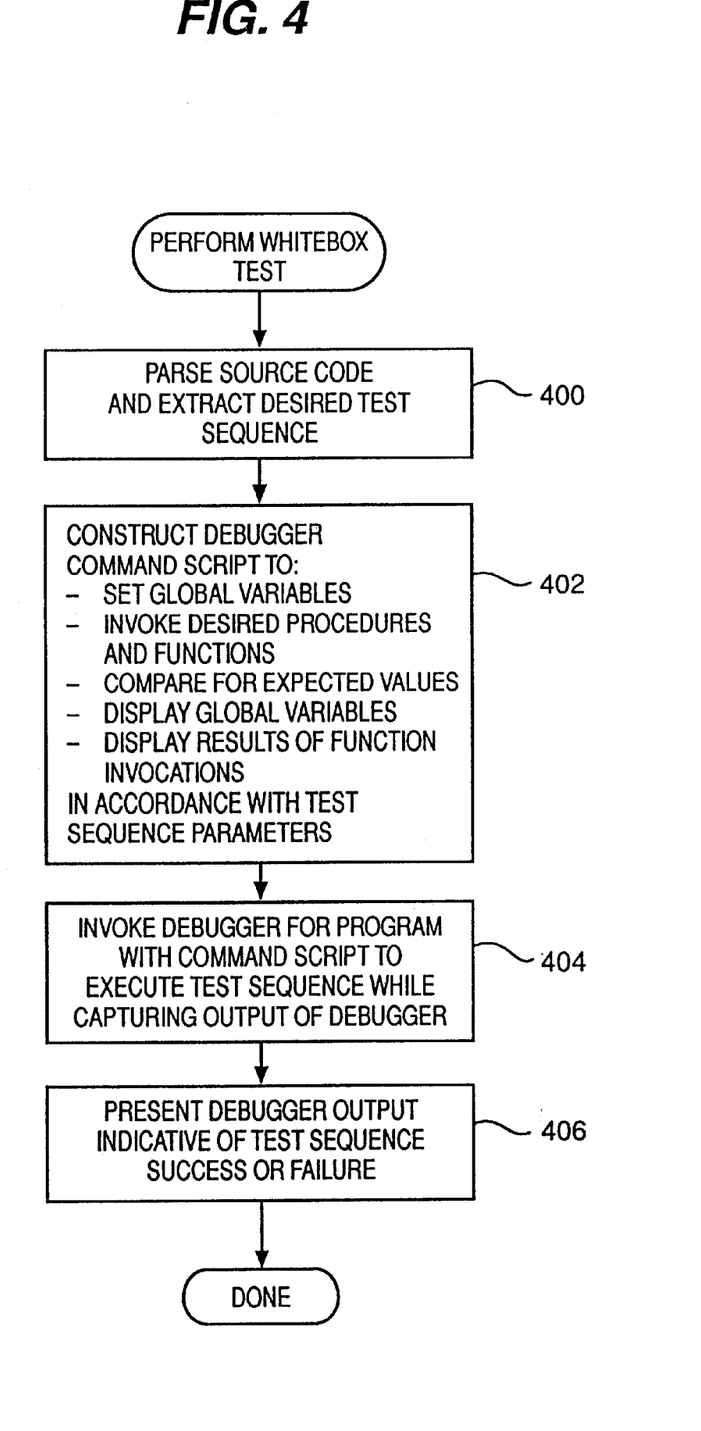
FIG. 4 is a flow chart describing a method of the present invention as specifically adapted for white box testing in accordance with the present invention.

FIG. 4 is a flow chart describing additional details of the methods of the present invention as operable to perform white box testing techniques on a program under test. As noted above, white box testing techniques of the present invention are performed in conjunction with a program debugging tool (debugger) to permit precise control of the execution of particular modules or functions within the program under test and to force particular errors in execution of a function or program. Those skilled in the art will understand that a debugging tool as used herein means it tool capable of performing incremental execution of particular procedures, functions, or modules within a program under test. Such debugging tools are well known to those skilled in the art and readily available for most commercial computing systems. In general, white box testing techniques of the present invention permit directives embedded within source code corresponding to the program under test to request setting of global variables within modules of program under test, to request invocation of particular procedures or functions within program under test, and to evaluate the results and side effects generated from operation of such procedures or functions. Results and side effects of such operations are reflected in changes to global or local variables, generation of output streams, and return values from invoked functions. These results of the test sequence are compared against expected values to determine success or failure of the test sequence.

Element 400 is operable in like manner to that of element 300 of FIG. 3 to parse source code files corresponding to the program under test and extract a desired test sequence. As noted above, a user may specify a particular, single test sequence to be performed (identified by a name), or may request multiple such tests be performed by the methods depicted in FIG. 4. Where multiple such tests are requested, the method FIG. 4 repeats such that element 400 is operable to obtain the next desired test sequence by parsing and extracting the test from source code files of the program under test.

Element 402 is next operable to construct the command script to be provided to the debugger for purposes of directing the entire test sequence. In particular, the command script provides commands to the debugger which:

Set goals variables to specify values,

Invoke desired procedures and functions with specific parameters,

Compare results of function or procedure invocation with expected results,

Display present values of global variables, and

Display function results from invocation of functions in the program under test.

These debugger commands of the command script are generated by operation of element 402 in accordance with the directives of the test sequence extracted from the program source code files.

Element 404 is next operable to invoke the debugger program providing the generated command script as input thereto. The debugger program then executes the test sequence as represented by the debugger commands in the command script file. The debugger, under direction of the generated command script, monitors and displays the present value of global and local variables of interest to detect proper operation of the program in accordance with the test sequence. In particular, the debugger tool is instructed to display selected variable values and the test executive is instructed to compare variable values or function return values to expected values and notify the user of any errors in the program operation from such comparisons. Output generated by the debugger while operating the program under test may be used for post processing analysis by an output analysis element (not shown). In the preferred embodiment, the test executive is capable of comparing global variable values, local variable values, or function return values, (displayed by the debugger tool) to expected result values under direction of its command script in accordance with test sequence.

Element 406 is finally operable to present to the user information indicative of success or failure of the test sequence. Success or failure is preferably indicated by messages generated from the debugger program while operating the program under test at the direction of the command script and underlying test sequence. Such messages may be generated to indicate that a particular global variable was not set to the expected resulting value, or a function invocation returned an unexpected value, etc.

Those skilled in the art will recognize a variety of commercially available debugger programs useful in white box testing in accordance with the present invention. Specifically, processing of element 404 in figure for may be performed by a debugger known as "xdb" (readily available in most Unix systems) or by a "gdb" (and variants thereof readily available in most Unix systems through the Free Software Foundation). Processing of elements 402 and 404 of FIG. 4 are therefore operable to generate appropriate commands in the command script as required by the particular debugger selected. In the preferred embodiment, the "xdb" debugger is utilized for executing the command script built in accordance with test sequence and methods of the present invention.

The methods of the present invention to perform black box testing or white box testing may be implemented using a number of programming styles and languages. For example, the test methods of the present invention may be implemented as custom program instructions in the C/C++ programming language. Or, for example, the methods may be implemented as shell scripts in a Unix or MS-DOS computing environment. Such design choices in implementing the techniques of the present invention are well known to those skilled in the art.

The following shell script describes the preferred embodiment of the present invention for performing black box testing techniques.

```
#! /bin/ksh -p
Command()
{
    print -p "$1"
    print -p " p 1234567890"
}
Response()
{
    while read -p LINE; do
        LINE="${LINE#>}"
        LINE="${LINE#>}"
        LINE="${LINE#>}"
        if [ "$LINE" = "1234567890" ]; then
            break
        fi
        echo "$LINE"
    done
}
if [ $# -lt 1 ]; then
    echo "Usage: ${0##*/} <program> [<testnum>]"
    exit 1
fi
rm -rf bb
mkdir -p bb
>bb/in
rm -f core
HOME=$PWD xdb -L -i bb/in -o bb/out -e bb/err $1 2>&1 |&
Command "s"
Response >/dev/null
Command "z 13 sir"
Response >/dev/null
Command "z 18 sir"
Response >/dev/null
Command "lf"
FILES=`Response | tail +2 | awk '{if ($2 != "end.c") print $2}' | grep -v^_'
print -p "k"
print -p "y"
Command "p 0"
Response >/dev/null
egrep "^BLACKBOX:|^BOX:" $FILES | sed "s!^*BOX: *!!" >bb/lines
TOTAL=0
PASS=0
N=0
SED="s!@@!@!g"
while read TEST; do
    if [ "${TEST##*@*}" = "" ]; then
        TEST=`set | grep ^TEST= | sed "s!^TEST=!!; $SED"`
    fi
    if [ "$TEST" != "${TEST#####}" ]; then
        ((N=N+1))
        if [ -z "${2:-}" -o "${2:-}" = "$N" -o "${2:-}" = "0" ]; then
            if [ "${2:-}" != "0" ]; then
                echo
            fi
            echo "$N: $TEST"
        fi
    elif [ -z "$TEST" -o "$TEST" != "${TEST###}" ]; then
        if [ -z "${2:-}" -o \( "${2:-}" = "$N" -a "$N" != "0" \) ]; then
            echo "$TEST"
        fi
    elif [ -z "${2:-}" -o "$N" = "0" -o "${2:-}" = "$N" ]; then
        ((TOTAL+=1))
        case "${TEST%% *}" in
            exec:)
```

```
EXEC="${TEST#exec:}"
while [ "$EXEC" != "${EXEC# }" ]; do
      EXEC="${EXEC# }"
done
if [ "$EXEC" != "${EXEC%==*}" ]; then
      ERV="${EXEC##*==}"
      while [ "$ERV" != "${ERV# }" ]; do
           ERV="${ERV# }"
      done
      EXEC="${EXEC%==*}"
else
      ERV=0
fi
if [ -n "$EXEC" ]; then
      Command "r $EXEC"
else
      Command "R"
fi
Response | grep "^Child process " >bb/exec
if grep "terminated normally" bb/exec >/dev/null; then
      RV="(0)"
elif RV=`grep "did an exit" bb/exec`; then
      RV=`echo "$RV" | awk '{ print $NF }"
else
      RV="(-1)"
fi
Command "db *"
Response >/dev/null
tr -d "\015" <bb/out >bb/OUT
mv bb/OUT bb/out
tr -d "\015" <bb/err >bb/ERR
mv bb/ERR bb/err
>bb/in
exec 4<bb/out 5<bb/err
if ((RV != ERV)); then
      echo "FAILED: $TEST"
      echo " EXPECTED: exit($ERV)"
      echo " RESPONSE: exit$RV"
      continue
fi
;;
failonce:|fail:)
      FAIL="${TEST#fail:}"
      FAIL="${FAIL#failonce:}"
      while [ "$FAIL " != "${FAIL# }" ]; do
           FAIL="${FAIL# }"
      done
      RV="${FAIL#* }"
      RV=`echo "$RV" | sed 's!;!; p !g'`
      FAIL="${FAIL%% *}"
      if [ "${TEST%% *}" = "failonce:" ]; then
           Command "ba $FAIL { Q ; bu { Q ; p \$r28 = $RV ; db * ; c } ; c }"
      else
           Command "ba $FAIL { Q ; bu { Q ; p \$r28 = $RV ; c } ; c }"
      fi
      Response >/dev/null
      ;;
file:)
      FILE="${TEST#file:}"
      while [ "$FILE" != "${FILE# }" ]; do
           FILE="${FILE# }"
      done
      rm -f $FILE
      touch $FILE
      ;;
in:)
      LINE="${TEST#in:}"
      while [ "$LINE" != "${LINE# }" ]; do
           LINE="${LINE# }"
      done
      if [ "$LINE" != "<blackbox-eof>" ]; then
           echo "$LINE" >>bb/in
      fi
      ;;
line:)
      LINE="${TEST#line:}"
      while [ "$LINE" != "${LINE# }" ]; do
           LINE="${LINE# }"
      done
```

```
            echo "$LINE" >>$FILE
            ;;
    mode:)
        MODE="${TEST#mode:}"
        while [ "$MODE" != "${MODE# }" ]; do
            MODE="${MODE# }"
        done
        chmod $MODE $FILE
        ;;
    out:|err:)
        if [ "${TEST%% *}" = "out:" ]; then
            FD=4
            EXPECTED="${TEST#out:}"
        else
            FD=5
            EXPECTED="${TEST#err:}"
        fi
        while [ "$EXPECTED" != "${EXPECTED# }" ]; do
            EXPECTED="${EXPECTED# }"
        done
        if [ "$EXPECTED" = "<blackbox-eof>" ]; then
            read RESPONSE <&$FD
            if [ "$?" != 1 ]; then
                echo "FAILED: $TEST"
                echo " EXPECTED: $EXPECTED"
                echo " RESPONSE: $RESPONSE"
                while read RESPONSE <&$FD; do
                    echo " EXPECTED: $EXPECTED"
                    echo " RESPONSE: $RESPONSE"
                done
                continue
            fi
        elif [ "$EXPECTED" != "*" ]; then
            read RESPONSE <&$FD
            if [ "$?" = 1 ]; then
                echo "FAILED: $TEST"
                echo " EXPECTED: $EXPECTED"
                echo " RESPONSE: <blackbox-eof>"
                continue;
            else
                while [ "$RESPONSE" != "${RESPONSE# }" ]; do
                    RESPONSE="${RESPONSE# }"
                done
                if [ "${RESPONSE##$EXPECTED}" != "" ]; then
                    echo "FAILED: $TEST"
                    echo " EXPECTED: $EXPECTED"
                    echo " RESPONSE: $RESPONSE"
                    continue
                fi
            fi
        else
            while read RESPONSE <&$FD; do
                :
            done
        fi
        ;;
    shell:)
        SHELL="${TEST#shell:}"
        while [ "$SHELL" != "${SHELL# }" ]; do
            SHELL="${SHELL# }"
        done
        eval $SHELL <bb/in >bb/out 2>bb/err
        >bb/in
        exec 4<bb/out 5<bb/err
        ;;
    subst:)
        SUBST="${TEST#subst:}"
        while [ "$SUBST" != "${SUBST# }" ]; do
            SUBST="${SUBST# }"
        done
        V="${SUBST#* }"
        V='$V'
        SUBST="${SUBST%% *}"
        SED="s!@$SUBST!$V!g; $SED"
        ;;
    *)
    echo "IGNORED: $TEST"
    continue
    ;;
```

-continued

```
            esac
            if [ "$N" -gt 0 ]; then
                echo "passed: $TEST"
            fi
            ((PASS+=1))
        fi
    done <bb/lines
    print -p "q"
    print -p "y"
    wait
    if [ -z "${2:-}" -o "${2:-}" != "0" ]; then
        echo "$PASS of $TOTAL blackbox tests passed"
        if [ "$PASS" != "$TOTAL" ]; then
            ((FAIL=TOTAL-PASS))
            echo "$FAIL BLACKBOX TESTS FAILED"
        fi
    fi
    rm -rf bb
```

The following shell script describes the preferred embodiment of the present invention for performing white box testing techniques.

```
#! /bin/ksh -p
Command()
{
    print -pr "$1"
    print -pr " p 1234567890"
}
Response()
{
    OXLINE=
    while :; do
        XLINE=
        while read -p LINE; do
            LINE="${LINE#>}"
            LINE="${LINE#>}"
            LINE="${LINE#>}"
            if [ "$LINE" = "1234567890" ]; then
                break
            elif [ "$LINE" != "${LINE#Command line or portion ignored:}" ]; then
                LINE="${LINE#Command line or portion ignored:}"
                LINE="${LINE#*\"}"
                LINE="${LINE%\"*}"
                XLINE="$XLINE ; $LINE"
                continue
            fi
            if [ -z "$OXLINE" ]; then
                echo "$LINE"
            fi
        done
        if [ -n "$XLINE" ]; then
            Command "$XLINE"
            OXLINE="$XLINE"
        else
            break
        fi
    done
}
if [ $# -lt 1 ]; then
    echo "Usage: ${0##*/} <program> [<testnum>]"
    exit 1
fi
rm -rf wb
mkdir -p wb
rm -f core
HOME=$PWD xdb -L $1 2>&1 |&
Command "s"
Response >/dev/null
Command "va 0"
Response >/dev/null
Command "z 13 sir"
Response >/dev/null
```

-continued

```
Command "z 18 sir"
Response >/dev/null
Command "p __InitializeBFA()"
Response >/dev/null
Command "lf"
FILES=`Response | tail +2 | awk '{if ($2 != "end.c") print $2}' | grep -v^_'
egrep "^WHITEBOX:|^BOX:" $FILES | sed "s!^ *BOX: *!!" >wb/lines
TOTAL=0
PASS=0
N=0
SED="s!@@!@!g"
while read TEST; do
    if [ "${TEST##*@*}" = "" ]; then
        TEST=`set | grep ^TEST = | sed "s!^TEST=!!; $SED"`
    fi
    if [ "$TEST" != "${TEST#####}" ]; then
        ((N=N+1))
        if [ -z "${2:-}" -o "${2:-}" = "$N" -o "${2:-}" = "0" ]; then
            if [ "${2:-}" != "0" ]; then
                echo
            fi
            echo "$N: $TEST"
        fi
        continue
    elif [ -z "$TEST" -o "$TEST" != "${TEST###}" ]; then
        if [ -z "${2:-}" -o \( "${2:-}" = "$N" -a "$N" != "0" \) ]; then
            echo "$TEST"
        fi
        continue
    elif [ -z "${2:-}" -o "$N" = "0" -o "${2:-}" = "$N" ]; then
        ((TOTAL+=1))
        case "${TEST%% *}" in
            failonce:|fail:)
                FAIL="${TEST#fail:}"
                FAIL="${FAIL#failonce:}"
                while [ "$FAIL " != "${FAIL# }" ]; do
                    FAIL="${FAIL# }"
                done
                RV="${FAIL#* }"
                RV=`echo "$RV" | sed 's!;!; p !g'`
                FAIL="${FAIL%% *}"
                if [ "${TEST%% *}" = "failonce:" ]; then
                    Command "ba $FAIL { Q ; bu {Q ; p \$r28 = $RV ; db * ; c } ; c }"
                else
                    Command "ba $FAIL { Q ; bu { Q ; p \$r28 = $RV ; c } ; c }"
                fi
                Response >/dev/null
                ;;
            subst:)
                SUBST="${TEST#subst:}"
                while [ "$SUBST" != "${SUBST# }" ]; do
                    SUBST="${SUBST# }"
                done
                V="${SUBST#* }"
                V=`$V`
                SUBST="${SUBST%% *}"
                SED="s!@$SUBST!$V!g; $SED"
                ;;
            *)
                if [ -z "${TEST##*==*}" ]; then
                    COMMAND="p ${TEST%%==*}"
                    while [ "$COMMAND" != "${COMMAND% }" ]; do
                        COMMAND="${COMMAND% }"
                    done
                    RESULT="${TEST##*==}"
                    while [ "$RESULT" != "${RESULT# }" ]; do
                        RESULT="${RESULT# }"
                    done
                    NAME="${TEST%%[(]*}"
                    NAME="${NAME##*[.>]}"
                    if [ "$RESULT" = "${RESULT#[0-9<-]}" ]; then
                        Command "p $RESULT"
                        RESULT=`Response`
                        RNAME="${RESULT%%[(]*}"
                        RNAME="${RNAME##*[.>]}"
                        RESULT="${RESULT##$RNAME =}"
                        while [ "$RESULT" != "${RESULT# }" ]; do
                            RESULT="${RESULT# }"
                        done
```

-continued

```
                fi
                EXPECTED="$NAME = $RESULT"
            else
                COMMAND="p $TEST"
                EXPECTED="*"
            fi
            Command "$COMMAND"
            RESPONSE='Response'
            if [ "$EXPECTED" != "*" -a \
                    "${RESPONSE##$EXPECTED}" != "" ]; then
                print -r "FAILED: $TEST"
                print -r " EXPECTED: $EXPECTED"
                print -r " RESPONSE: $RESPONSE"
                continue
            elif [ "$EXPECTED" = "*" -a \
                    "$RESPONSE" != "${RESPONSE##* [(][UI]E}" ]; then
                print -r "FAILED: $TEST"
                print -r " RESPONSE: $RESPONSE"
                continue
            fi
            Command "db *"
            Response >/dev/null
        esac
        if [ "$N" -gt 0 ]; then
            print -r "passed: $TEST"
        fi
        ((PASS+=1))
    fi
done <wb/lines
Command "p _UpdateBFA()"
Response >/dev/null
print -p "q"
print -p "y"
wait
if [ -z "${2:-}" -o "${2:-}" != "0" ]; then
    echo "$PASS of $TOTAL whitebox tests passed"
    if [ "$PASS" != "$TOTAL" ]; then
        ((FAIL=TOTAL-PASS))
        echo "$FAIL WHITEBOX TESTS FAILED"
    fi
fi
rm -rf wb
```

The following test sequence directives (test commands) are supported by the above discussed black box and white box shell scripts. Those skilled in the art will readily recognize a variety of additional test sequence directives which may be added to this list and supported by methods of the present invention. The following list of test directives is therefore intended as exemplary and not as exclusive of other test directives. Further, those skilled in the art will readily recognize a variety of syntactic variations for expressing the test directives listed below. Such design choices for specifying test directives are well known to those in skilled in the art. As noted above, test directives are preferably embedded in source code files of the program under test within comments as defined by programming language of the source code files.

Whitebox test directives include:

| Description | Exemplary Syntax |
|---|---|
| Declare new test | ### test ### |
| Rule substitution (@name) | subst: name command... |
| Set global data | globaldata = value |
| Call procedures | procedure(args...) |

-continued

Whitebox test directives include:

| Description | Exemplary Syntax |
|---|---|
| Call functions and verify return value | function(args...) == value |
| Verify global data | globaldata == value |

The following whitebox test example demonstrates use of some of the above directives embedded within a C language program.

```
/*
globalmax() ###
global = 10
globalmax(1, 2) == 10
globalmax(20, 2) == 20
globalmax(1, 30) == 30
*/
int global;
globalmax(a1, a2) {
    if (a1 >= a2 && a1 >= global) return a1;
    if (a2 >= a1 && a2 >= global) return a2;
    return global;
}
```

| Blackbox test directives include: | |
| --- | --- |
| Description | Exemplary Syntax |
| Start new test | ### test ### |
| Rule Substitution (@name) | subst: name command ... |
| Create file | file: name |
|  | mode: mode |
|  | line: line |
|  | ... |
|  | line: <eof> |
| Set up stdin for next "exec" or "shell" | in: line |
|  | ... |
|  | in: <eof> |
| Force function to fail at next "exec" | fail: function value |
| Exec program (<in >out 2>err) | exec: args ... |
| Exec shell command (<in >out 2>err) | shell: command ... |
| Verify stdout of last "exec" or "shell" | out: line (may contain shell wildcards) |
|  | ... |
|  | out: <eof> |
| Verify stderr of last "exec" or "shell" | err: line (may contain shell wildcards) |
|  | ... |
|  | err: <eof> |

The following blackbox test example demonstrates use of some of the above directives embedded within a C language program.

```
/*
id ###
subst: AMI whoami
exec: -un
out: @AMI
out: <eof>
err: <eof>
fail: getuid 0
exec: -un
out: root
out: <eof>
err: <eof>
*/
```

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for testing a computer program comprising:

a test sequence extractor which extracts a test sequence from a source code file corresponding to said program wherein said test sequence is embedded in said source code file in a manner transparent to the underlying programming language within said source code file; and a test manager, coupled to said test sequence extractor, which performs said test sequence by applying input information associated with said test sequence to said program and evaluating output information generated by said program to determine whether said program is operating properly.

2. The system of claim 1 wherein said test sequence comprises comments embedded within said source code file.

3. The system of claim 1 wherein said test manager includes:

a test sequence interpreter which interprets said test sequence;

a test executive, responsive to said test sequence interpreter, which invokes said program in accordance with said test sequence and which applies said input information to said program in accordance with said test sequence; and a test output processor, responsive to said test sequence interpreter, which evaluates said output information in accordance with said test sequence.

4. The system of claim 3 wherein said test output processor includes:

an output capture element which receives said output information from said program; and an output comparator element which compares the captured output information with expected output information in accordance with said test sequence.

5. The system of claim 3 wherein said test executive comprises:

a program debugging tool.

6. The system of claim 5 wherein said program debugging tool includes:

a subfunction invocation element which invokes an identified subfunction within said program in accordance with said test sequence.

7. A software test tool for performing white box testing of a program, said test tool comprising:

a test sequence interpreter which interprets a predefined test sequence wherein said predefined test sequence is embedded in a source code file corresponding to said program in a manner transparent to the underlying programming language within said source code file; and a test sequence executive, coupled to said test sequence interpreter, which invokes an identified subfunction within said program in accordance with said test sequence to verify proper operation of said subfunction.

8. The test tool of claim 7 wherein said test sequence interpreter includes:

a test sequence extractor which extracts said test sequence from said source code file associated with said program.

9. The test tool of claim 8 wherein said test sequence is encoded as a comment in the source code file.

10. The test tool of claim 7 wherein said test sequence executive comprises a debugger.

11. The test tool of claim 10 wherein said debugger includes:

means for applying input information associated with said test sequence to said identified subfunction; and means for capturing output information generated by said identified subfunction.

12. The test tool of claim 11 wherein said test executive further comprises:

means for comparing the captured output information with expected results associated with said test sequence to verify proper operation of said identified subfunction.

13. A method for testing a computer program comprising the steps of:

extracting a test sequence from a source code file corresponding to said program wherein said test sequence is embedded in said source code file in a manner transparent to the underlying programming language within said source code file;

executing said test sequence by applying input information associated with said test sequence to said program; and evaluating output information generated by said program to determine whether said program is operating properly.

14. The method of claim 13 wherein said test sequence comprises comments embedded within said source code file.

15. The method of claim 13 wherein the step of executing includes the steps of:

interpreting said test sequence;

invoking said program in accordance with said test sequence;

applying said input information to said program in accordance with said test sequence; and evaluating said output information in accordance with said test sequence.

16. The method of claim 15 wherein said the step of evaluating includes the steps of:

capturing said output information from said program; and comparing the captured output information with expected output information in accordance with said test sequence.

17. The method of claim 15 wherein the step of executing is performed by a program debugging tool.

18. The method of claim 17 wherein the step of invoking includes the step of:

invoking an identified subfunction within said program in accordance with said test sequence.

19. A method for performing white box testing of a program, said method comprising the steps of:

interpreting a predefined test sequence wherein said predefined test sequence is embedded in a source code file corresponding to said program in a manner transparent to the underlying programming language within said source code file; and invoking an identified subfunction within said program in accordance with said test sequence to verify proper operation of said subfunction.

20. The method of claim 19 wherein the step of interpreting includes the step of:

extracting said test sequence from said source code file associated with said program.

21. The method of claim 20 wherein said test sequence is encoded as a comment in the source code file.

22. The method of claim 19 wherein the step of invoking is performed by a debugger.

23. The method of claim 22 wherein the step of invoking includes the steps of:

applying input information associated with said test sequence to said identified subfunction; and capturing output information generated by said identified subfunction.

24. The method of claim 23 wherein the step of executing further comprises the step of:

comparing the captured output information with expected results associated with said test sequence to verify proper operation of said identified subfunction.

* * * * *